3,637,607
SILICON-CONTAINING POLYAMIDE
Alvin D. Delman, Old Bethpage, Hanna N. Kovacs, Kew Gardens, and Bernard B. Simms, Franklin Square, N.Y., assignors to the United States of America as represented by the Secretary of the Navy
Filed Feb. 12, 1969, Ser. No. 798,640
Int. Cl. C08g 20/20
U.S. Cl. 260—78 R     2 Claims

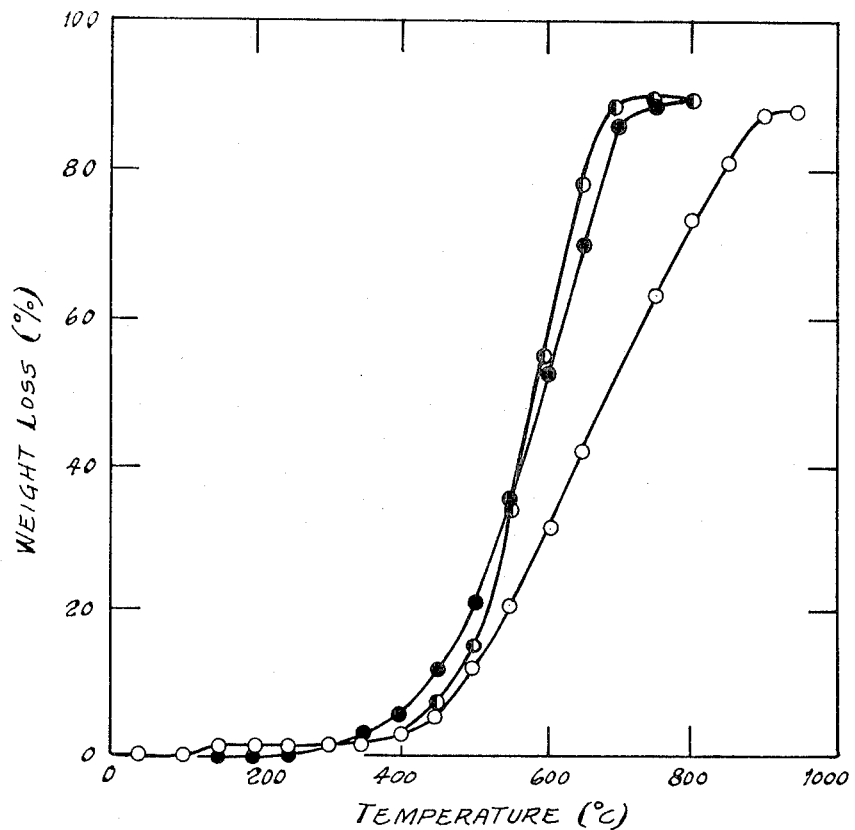
LEGEND
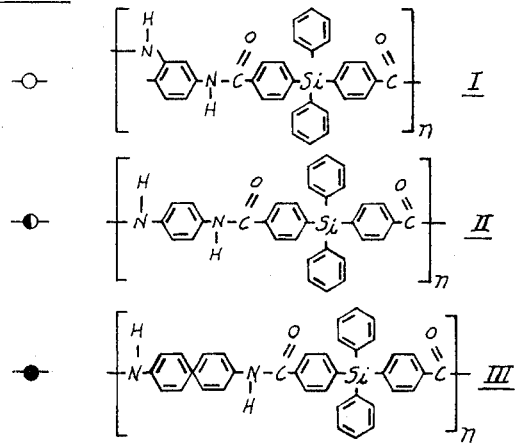
INVENTORS.
ALVIN D. DELMAN
HANNA NAGY KOVACS
BERNARD B. SIMMS es Patent Office 3,637,607
Patented Jan. 25, 1972

ABSTRACT OF THE DISCLOSURE

Aromatic silicon-containing polyamides soluble in organic solvents and stable up to about 400° C., prepared by reaction of bis(p-chlorocarbonylphenyl) diphenylsilane and m-(or p-)phenylenediamine or by reaction of bis(p-carbopentachlorophenoxyphenyl) diphenylsilane and benzidine or by reaction of bis-p-carbo-(p-nitrophenoxy) phenyldiphenylsilane and benzidine. Solution-cast films from the polymers are flexible and show good adhesion to glass and metal surfaces.

---

The invention described herein may be manufactured and used by or for the Government of the United States of America for governmental purposes without the payment of any royalties thereon or therefor.

There has long been a need for a solid-state material that is soluble in organic solvents stable over a temperature range up to several hundred degrees centigrade, applicable as a protective adherent coating to a smooth surfaced metal or glass substrate, capable of being molded, formed into sheet film or extruded as a filament, and preferably has electrical insulating properties.

In recent years, many investigations have been directed toward the synthesis of chemically and thermally stable polymers with recurrent units containing aromatic structures. For example, S. B. Speck reported the preparation of silicon-containing polyamides from alkyl and alkaryl diamines in the Journal of Organic Chemistry, 1953, vol. 18, p. 1689. These polymers soften at about 200° C., too low for many space vehicle applications or for use in environments or equipments where high temperature is normal or anticipated. Speck in U.S. Pat. 2,722,524 discloses a method of preparing bis(p-carboxyphenyl)diphenyl silane but which results in a compound not sufficiently pure for the purposes set forth in this application.

An object of this invention is to provide a polyamide that is soluble in organic solvents and is chemically and physically stable over a temperature range that is comparable to polyamides known heretofore.

Other objects, advantages and novel features of the invention will become apparent from the following detailed description of the invention when considered in conjunction with the accompanying drawings wherein:

The single figure shows thermograms of three different polyamides synthesized according to the teachings of this invention.

This invention concerns silicon-containing polyamides that are substantially more heat stable than those of the prior art. They are prepared from aromatic diamines; each of them does not melt before starting to decompose and does not start to decompose until its temperature is elevated to about 400° C.

In this invention, silicon-containing polyamide having desired properties was produced by interfacial techniques reported by E. L. Wittbecker and P. W. Morgan in Journal of Polymer Science, 1959, vol. 40, p. 289, and also was produced by solution polycondensation techniques as reported by P. W. Morgan in Macromolecular Chemistry (Journal of Polymer Science C., vol. 4), M. Magat, Ed., Interscience, New York 1963, p. 1075. Employing these techniques, equimolar quantities of white crystalline bis(p-chlorocarbonylphenyl) diphenylsilane and m-phenylenediamine are reacted to produce the polyamide.

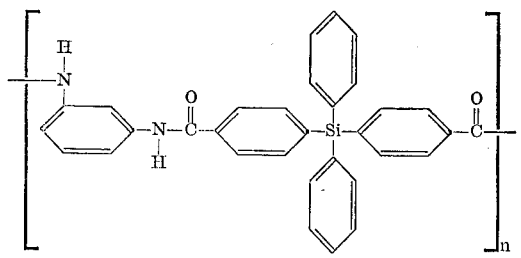

Employing the same techniques, equimolar quantities of white crystalline bis(p-chlorocarbonylphenyl)diphenylsilane and p-phenylenediamine are reacted to produce the polyamide

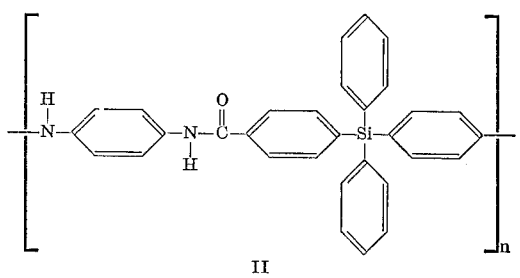

II

For both reactions using the interfacial polymerization technique, methylene chloride was employed as organic solvent and sodium carbonate was employed as the base. In the synthesis by solution polycondensation, the reactants were in chloroform solution and in dimethylacetamide solution respectively and the products had the same structural formulas as indicated above for the products of the interfacial polymerization technique.

Also, in this invention, silicon-containing polyamide having the desired properties is synthesized by refluxing bis(p-carbopentachlorophenoxyphenyl)diphenylsilane with benzidine in N,N-diethylaniline or by reacting bis-p-carbo-(p-nitrophenoxy)phenyldiphenylsilane with benzidine to produce the polyamide.

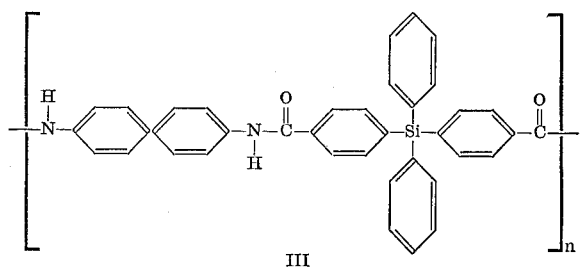

III

Silicon-containing polyamides synthesized by the interfacial condensation methods using m-phenylenediamine and p-phenylenediamine had inherent viscosities 0.95 and 1.86 respectively. Silicon-containing polyamides synthesized by polycondensation of the reactants in chloroform solution using m-phenylenediamine and p-phenylenediamine had inherent viscosities 0.69 and 0.79, respectively. Silicon-containing polyamides synthesized by polycondensation reactions in dimethylacetamide using m-phenylenediamine and p-phenylenediamine had inherent viscosities of 0.27 and 0.26 respectively. Silicon-containing polyamide synthesized by refluxing bis(p-carbopentachlorophenoxyphenyl)diphenylsilane with benzidine was produced in 64% yield and had inherent viscosity of 0.20; a number-average molecular weight of about 20,000 (approximately 34 recurring units) was calculated on the basis of chlorine analysis, assuming an average of one pentachlorophenyl end group per polymer chain. Silicon-containing polyamide synthesized by reaction of benzidine and bis - p-carbo - (p-nitrophenoxy)phenyldiphenylsilane had an inherent viscosity of 0.38, but the yield was only 19%.

Inherent viscosity measurements were made at 30° C. from N,N-dimethylacetamide solutions containing 5% of lithium chloride.

Efforts to prepare silicon-containing polyamide by reaction of bis(p-carbomethoxyphenyl)diphenylsilane and phenylenediamines were unsuccessful; the bis(p-carbomethoxyphenyl)diphenylsilane was prepared by treating bis(p-carboxyphenyl)diphenylsilane with excess of diazomethane.

Thermal data taken on the products indicated in the FIG. 1 that all of the silicon containing polyamides products obtained in accordance with this invention posess good resistance to decomposition when heated in air to about 400–450° C.; the polyamide I was most resistant.

Films of the polymers made according to Examples 5–7, 9, 11 deposited on aluminum from N,N-dimethylacetamide and heated in air for 100 hours at 300° C., were slightly darkened and showed excellent adhesion to the aluminum substrate after being flexed manually.

Bis(p-chlorocarbonylphenyl) diphenylsilane

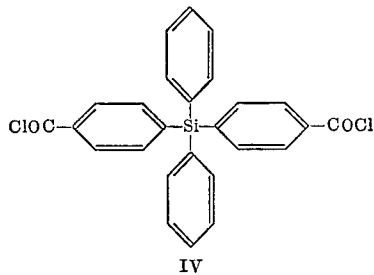

IV is a novel compound that was synthesized as an intermediate for use in the synthesis of the desired polymers; this compound was synthesized by reacting white crystalline bis(p-carboxyphenyl)diphenylsilane

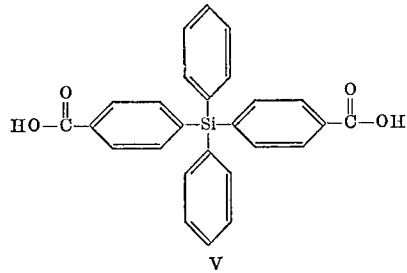

V and thionyl chloride. The compound bis(p-carboxyphenyl) diphenysilane was synthesized by oxidizing diphenyldi(p-tolyl) silane with chromic anhydride using a method based on that for the oxidation of alkarylsiloxanes reported by D. W. Lewis and G. C. Gaines, in the Journal of the American Chemical Society, 1952, vol. 74, p. 2931. S. B. Speck reports another method of preparing bis(p-carboxyphenyl) diphenylsilane in U.S. Pat. 2,722,524 by oxidation of diphenyldi(p-tolyl)silane with potassium permanganate.

In this invention, diphenyldi(p-tolyl)silane was prepared by reacting 4-bromotoluene with lithium to botain 4-lithiotoluene and then by reacting the 4-lithiotoluene with diphenyldichlorosilane, following the procedure reported by M. Maienthal et al. in Journal of the American Chemical Society, 1954, vol. 76, p. 6392. The compound prepared according to the Speck procedure is not sufficiently pure for the purposes set forth in this application; a purer compound suitable for the purposes described was produced by methods illustrated by Examples 1 and 2.

EXAMPLE 1

Oxidation of diphenyldi(p - tolyl)silane to bis(p - carboxyphenyl)diphenylsilane:

A well stirred solution of 90 milliliters of glacial acetic acid, 30 milliliters of acetic anhydride and 7.2 milliliters of concentrated sulfuric acid was cooled to +10° C. While continuously agitating the partially frozen mixture, about 1.5 grams of chromic anhydride was added; then about 0.3 gram of diphenyldi(p-tolyl)silane was added. This sequence was repeated until a total of 0.12 mole (12 grams) of chromic anhydride was added and a total of 0.012 mole (4.4 grams) of diphenyldi(p-tolyl) silane were added, a molar ratio of 10 to 1. The two reactants were added alternately to the mixture over a period of 50 minutes. During this time, temperature was kept down to between 13–15° C. Stirring was continued for another seventy-five minutes while permitting a slight rise in temperature but strictly preventing the temperature from rising above 17° C. Then the reaction mixture was poured over crushed ice and stirred vigorously for one hour following which the mixture was filtered and a pale precipitate was obtained which was washed several times with water. The wet precipitate was then dissolved in ether. The ether solution was separated from a gummy residue and then from some of the water, and then dried over anhydrous magnesium sulfate. The drying agent was filtered out and washed thoroughly with ether three times. The ether solution combined with the ether washings was concentrated under vacuum until crystals started to form. Then petroleum ether was added, and 3.63 grams of crude bis(p-carboxyphenyl)diphenylsilane was isolated (yield 70.8%), melting point 258°–262° C. This crude product was dissolved in ether, and petroleum ether (boiling point 37°–48° C.) was added slowly until faint cloudiness appeared. Then the solution was treated with charcoal, concentrated under vacuum until crystals appeared, and diluted with an equal volume of petroleum ether (boiling point 37°–48° C.). The crystals were separated by filtration and dried; the purified crystals melted at 266–268° C.

EXAMPLE 2

Oxidation of diphenyldi(p - tolyl)silane to bis(p - carboxyphenyl)diphenylsilane:

To a well stirred suspension of 0.03 mole (10.92 grams) of diphenyldi(p-tolyl)silane in a mixture of 450 milliliters of glacial acetic acid, 150 milliliters of acetic anhydride, and 18 milliliters of concentrated sulfuric acid, was added 1.2 moles (120 grams) of chromic anhydride over a period of 55 minutes while maintaining the temperature of the mixture at 15° C. The reaction mixture was stirred for an additional 10 minutes, poured onto ice and stirred vigorously for about 30 minutes. After filtering, the residue was washed thoroughly with water and air-dried to produce 12.3 grams (96% yield) of colorless crude produce, melting point 258°–264° C. (uncorrected). The crude material was dissolved in acetone, treated with activated charcoal, filtered, and reprecipitated with water. The precipitate was separated, dried, and dissolved in 250 milliliters of ether. The insoluble material was removed by filtration and the ether solution was concentrated until crystals started to form. Then an equal volume of petroleum ether was added and 9.65 grams of purified white crystalline product was recovered, melting point 266°–268° C. (uncorrected).

The products of Examples 1 and 2 were presumed to be bis(p-carboxyphenyl)diphenylsilane, $C_{26}$, $H_{20}$, $O_4$ Si, in that composition the carbon is calculated as 73.56% by weight; the hydrogen 4.75% by weight; the silicon 6.62% by weight. The identity of the products was confirmed by analysis from which it was found to have 73.57% by weight carbon, 4.76% by weight hydrogen, and 6.57% silicon.

Then the dicarboxylic acid obtained from Example 1 or 2 is converted to the diacid chloride.

EXAMPLE 3

Preparation of bis(p-chlorocarbonylphenyl)diphenylsilane:

A mixture of 0.015 mole (6.36 grams) of bis(p-carboxyphenyl)diphenylsilane

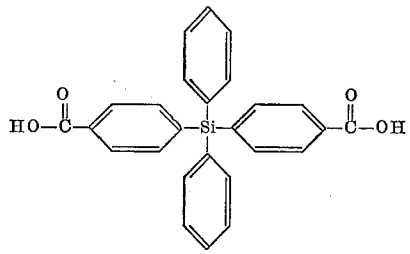

and 120 milliliters of thionyl chloride was refluxed for 40 minutes. The resulting clear solution was concentrated to dryness and the residue recrystallized from ligroin (boiling point 90°–120° C.) to produce 6.3 grams (91% yield) of solid product, melting point (uncorrected) 183°–185° C. The product was analyzed and found to contain 67.62% carbon, 4.44% hydrogen, 15.07% chlorine, and 5.97% silicon. Bis(p-chlorocarbonyl)diphenylsilane, $C_{26}H_{18}Cl_2O_2Si$ contains 67.68% carbon, 3.93% hydrogen, 15.37% chlorine, and 6.09% silicon, calculated, confirming the identity of the product.

The infrared spectrum from the dicarboxylic acid obtained from Examples 1 and 2 showed a carboxyl group absorption band at 5.9 microns. After the diacid chloride preparation by the procedure of Example 3, the peak disappeared and was replaced by two peaks in the carbonyl region at 5.64 and 5.76 mcirons.

EXAMPLE 4

Preparation of silicon-containing polyamide from m-phenylenediamine:

To an ice-cooled solution of 0.005 mole (2.306 grams) of the product of Example 3, bis(p-chlorocarbonylphenyl)diphenylsilane, in 75 milliliters of methylene chloride was added 0.005 mole (0.54 grams) of m-phenylenediamine and 0.005 mole (0.53 gram) of sodium carbonate in 50 milliliters of water. The reaction mixture was cooled in an ice bath and stirred for 30 minutes. The precipitate that formed was separated by filtration and washed with water, acetone, and methylene chloride, and then several times in sequence with water and acetone to produce 2.1 grams (84.6% yield) of white polymer having an inherent viscosity of 0.95 (0.2% solution). The polymer was purified by dissolving it in dimethylformamide, filtering the solution, and pouring the filtrate into a large volume of water. The resultant precipitate was filtered under suction, washed with acetone and petroleum ether, and dried under vacuum over boiling water for several hours. From chemical analysis, the product was found to contain 74.64% carbon, 5.04% hydrogen, 6.28% nitrogen, and 5.59% silicon. Calculated analysis of the polyamide $C_{32}H_{24}N_2O_2Si \cdot H_2O)_n$ is 74.68% carbon, 5.09% hydrogen, 5.44% nitrogen, and 5.45% silicon.

EXAMPLE 5

Preparation of silicon-containing polyamide from m-phenylenediamine:

A solution of 1.97 millimole (0.914 gram) of the product of Example 3 in 25 milliliters of chloroform was added to a mixture of 1.97 millimole (0.214 gram) of m-phenylenediamine, 10 milliliters of chloroform, and 3.94 millimole (0.533 milliliter) of triethylamine. The mixture was stirred vigorously until a heavy precipitate formed. It was then allowed to warm to room temperature and stirring was continued for one hour. After filtration, the precipitate was washed and dried as before, yielding 0.73 gram of polymer (74% yield) with inherent viscosity of 0.69 (0.5% solution). From chemical analysis, the polymer product was found to contain 74.61% carbon, 4.96% hydrogen, 6.11% nitrogen, and 5.72% silicon. Calculated analysis of the polyamide $$(C_{32}H_{24}N_2O_2Si \cdot H_2O)_n$$

is 74.68% carbon, 5.09% hydrogen, 5.44% nitrogen, 5.45% silicon confirming the identity of the polyamide.

EXAMPLE 6

Preparation of silicon-containing polyamide from m-phenylenediamine:

Equimolar quantities of bis(p-chlorocarbonylphenyl)diphenysilane obtained from Example 3 and m-phenylenediamine were interacted in dimethylacetamide for 0.5 hour at —20° to 0° under nitrogen. After warming to room temperature and stirring for several hours, the mixture was poured into water. The precipitate was separated by filtration, washed with water and acetone, and dried to produce the silicon-containing polyamide 72% yield having an inherent viscosity of 0.22 (0.5% solution).

EXAMPLE 7

Preparation of silicon-containing polyamide from p-phenylenediamine:

Bis(p-chlorocarbonylphenyl)diphenylsilane were reacted with p-phenylenediamine in methylene chloride by the same procedures as in the Examples 4, 5 and 6 concerning reacting bis(p-chlorocarbonylphenyl)diphenylsilane and m-phenylenediamine. The reaction in methylene chloride gave 72% yield of polymer product with inherent viscosity of 1.86 (0.2% solution). The polymer product was dissolved in dimethyl acetamide, the solution was filtered, and the filtrate was poured into a threefold volume of water. The precipitate was filtered and dried under vacuum over boiling water for 8 hours. From chemical analysis, the polymer product was found to contain 76.74% carbon, 5.02% hydrogen, 5.65% nitrogen, and 5.76% silicon. Calculated analysis of the polyamide $(C_{32}H_{24}N_2O_2Si)_n$ is 77.39% carbon, 4.87% hydrogen, 5.63% nitrogen and 5.66% silicon.

An 88.5% yield of polymer product having an inherent viscosity of 0.78 (0.5% solution) was obtained by reacting bis(p-chlorocarbonylphenyl)diphenylsilane and p-phenylenediamine in chloroform by the procedure as in the preceding examples. From chemical analysis of the polymer product, it was found to contain 74.58% carbon, 4.95% hydrogen, 6.05% nitrogen, and 5.98% silicon. Calculated analysis of the polyamide $$(C_{32}H_{24}N_2O_2Si \cdot H_2O)_n$$

is 74.68% carbon, 5.09% hydrogen, 5.44% nitrogen, 5.45% silicon.

A 40% yield of polymer product with an inherent viscosity of 0.26 (0.5% solution) was obtained by reacting bis(p-chlorocarbonylphenyl)diphenylsilane and p-phenylenediamine in dimethethylacetamide.

EXAMPLE 8

Synthesis of bis(p-carbopentachlorophenoxyphenyl)diphenylsilane:

To a solution of 0.04 mole (10.64 grams) of pentachlorophenol in 50 milliliters of dry ethyl acetate was added 0.04 mole (8.24 grams) of dicyclohexylcarbodiimide in 50 milliliters of the same solvent. After standing at room temperature for 10 minutes, 0.01 mole (4.24 grams) of dicarboxylic acid synthesized in accordance with Examples 1 and 2, suspended in 100 milliliters of ethyl acetate was added to the clear solution. The acid dissolved immediately and, after a few seconds, crystal formation was observed. The reaction mixture was allowed to stand at room temperature for 15 hours and then refluxed for 2.5 hours. The mixture was concentrated under vacuum to a volume of about 100 milliliters and cooled in an ice bath for several hours. The crystalline mixture was separated by filtration and washed in sequence with ice-cold ethyl acetate, acetone, and ether to remove unreacted materials. Then the 12.5 grams of residue was washed with 300 milliliters of benzene to dissolve the product; and leave 4.1 grams of insoluble dicyclohexylurea, melting point (uncorrected) 228°–230° C. The benzene solution was concentrated under vacuum to a volume of 50 milliliters diluted, with 250 milliliters of dry acetone, and cooled in an ice bath for 1 hour to give 6.5 grams of the product, melting point (uncorrected) 269°–271° C. An additional 1 gram of the product, melting point (uncorrected) 264°–266° C. was recovered from the mother liquor to produce a total yield of 81.4%. A sample for analysis was recrystallized from benzene and ethyl acetate (1:10) and dried in vacuum over boiling water, melting point (uncorrected) 269°–271° C. The product was analyzed and found to contain 49.94% carbon, 1.95% hydrogen, 38.14% chlorine and 2.91% silicon. The product was identified as bis(p-carbopentachlorophenoxyphenyl) diphenylsilane, $C_{38}H_{18}Cl_{10}O_4Si$ which contains 49.55% carbon, 1.97% hydrogen, 38.49% chlorine, and 3.05% silicon.

EXAMPLE 9

Polyamide from benzidine:

A mixture of 1 millimole (0.184 gram) of benzidine and 1 millimole (0.921 gram) of bis(p-carbopentachlorophenoxyphenyl)diphenylsilane, the product of Example 8, was refluxed in 20 milliliters of N,N-diethylaniline for 52 hours under a dry nitrogen atmosphere. After cooling to room temperature, 60 milliliters of benzene was added to the semisolid reaction mixture. The insoluble fraction was separated by filtration and washed with benzene, ethyl acetate, and acetone. After purification there remained 0.37 gram (64.6% yield) of tan solid polymer having an inherent viscosity of 0.20 (0.2% solution). From chemical analysis it was found to contain 78.17% carbon, 5.29% hydrogen, 5.25% nitrogen, 4.91% silicon, and 0.89% chlroine from chain ends. Silicon-containing polyamide, $(C_{38}H_{28}N_2O_2Si)_n$ contains 79.69% carbon, 4.93% hydrogen, 4.89% nitrogen and 4.90% silicon, calculated.

EXAMPLE 10

Preperation of bis-p-carbo-(p-nitrophenoxy)phenyldiphenylsilane:

A solution of 0.01 mole (1.4 grams) of n-nitrophenol and 0.01 mole (2.06 grams) dicyclohexylcarbodiimide dissolved in 50 milliliters of dry ethyl acetate was allowed to stand for 10 minutes. Then 0.0025 mole (1.06 grams) of dicarboxylic acid (Examples 1, 2) was added in several portions. After a few minutes, crystals started to separate. The reaction mixture remained at room temperature for 15 hours, then was refluxed for 3 hours, and cooled in an ice bath to give 1.13 grams of crystals that were separated by filtration. The crystals were washed with ice-cold ethyl acetate and then with ether. The residue was triturated with hot benzene to leave 647 milligrams (57.8% yield) of dicyclohexylurea, melting point (uncorrected) 228°–230° C. The benzene solution was evaporated to dryness and the residue was washed with methyl alcohol to yield 363 milligrams of the product, melting point (uncorrected) 290°–292° C. The mother liquor from the original reaction mixture was concentrated to an oily crystalline paste that was washed with ether and then with hot methyl alcohol to obtain an additional 325 milligrams of the product (total yield 42%), melting point (uncorrected) 291–292° C. after recrystallization from a 1:10 mixture of benzene and methyl alcohol. The product was analyzed and found to contain 68.72% carbon, 3.88% hydrogen, 4.56% nitrogen, and silicon 4.48%. Bis-p-carbo-(p-nitrophenoxy)phenyldiphenylsilane, $C_{38}H_{26}N_2O_8Si$, has 68.45% carbon, 3.94% hydrogen, 4.20% nitrogen, and 4.21% silicon, calculated.

EXAMPLE 11

The procedure of Example 9 was repeated except that benzidine and bis-p-carbo-(p-nitrophenoxy)phenyldiphenylsilane the product of Example 10 were the reactants and the reflux time was 11 hours. Specifically, a mixture of 1 millimole (0.184 gram) of benzidine and 1 millimole (0.667 gram) of bis-p-carbo-(p-nitrophenoxyphenyl) diphenylsilane was refluxed in 25 milliliters of N,N-diethylaniline for 11 hours. After cooling to room temperature the separated solid fraction was filtered out, washed with diethylaniline, benzene and ethyl acetate and 108 milligrams (18.8% yield) of powdery material was isolated having inherent viscosity 0.40.

EXAMPLE 12

Efforts were madt to prepare polyamides by reacting bis(p-carbomethoxyphenyl)dimethylsilane and m-(or p-) phenylenediamine but without success. When the two components, dimethyl ester and m-(or p-) phenylenediamine in equimolar quantities, were heated in benzene, toluene and dimethyl formamide solutions respectively, for 5 hours, 17 hours, and 24 hours, under nitrogen blanket tar formation resulted, and from the solution, only ether soluble residue was isolated, indicating that no polymer was formed.

Thermograms from specimens of silicon-containing polyamides I, II, and III made in accordance with this invention are shown in the drawing. Results show that the polymer structural Formula I derived from m-phenylenediamine, Examples 4, 5, 6 is somewhat more heat resistant than the product structural Formula II prepared from the para isomer, Example 7. The relative order of thermal stability of these polymers parallels the results obtained with aromatic amides without silicon atoms. Below 570° C., the polyamide structural Formula III derived from benzidine Examples 9 and 11, is slightly less heat stable than those derived from phenylenediamines. This is contrary to what would be expected from the general conclusions of studies of the relative heat resistance of aromatic acid amides.

Obviously many modifications and variations of the present invention are possible in the light of the above teachings. It is therefore to be understood that within the scope of the appended claims the invention may be practiced otherwise than as specifically described.

We claim:

1. The aromatic silicon-containing polyamide that is the reaction product obtained by reacting bis(p-chlorocarbonylphenyl) diphenylsilane, and a material selected from the group consisting of m-phenylenediamine and p-phenylenediamine, said polyamide being soluble in organic solvents and stable up to about 400° C., having the characteristics that solution-cast films from the polymers are flexible and adhere well to glass and metal surfaces, and are capable of being molded or formed into sheet film or extruded as a filament, said polyamide consisting essentially of repeating units of the formula

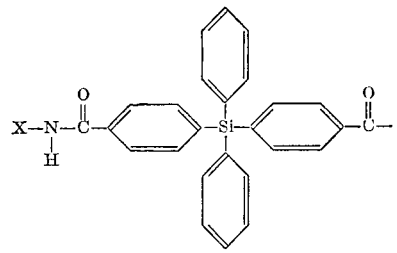

where x is a para-substituted aromatic anilino group.

2. The aromatic silicon-containing polyamide that is the reaction product obtained by reacting benzidine and a material selected from the group consisting of bis(p-carbopentachlorophenoxyphenyl) diphenylsilane and p-carbo-(p-nitrophenoxy) phenyldiphenylsilane, said polyamide being soluble in organic solvents and stable up to about 400° C., having the characteristic that solution-cast films from the polymers are flexible and adhere well to glass and metal surfaces, and are capable of being molded or formed into sheet film or extruded as a filament, said polyamide consisting essentially of repeating units of the formula
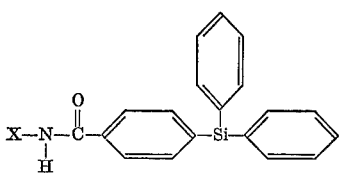
where x is a meta-substituted anilino group.
References Cited
UNITED STATES PATENTS
| | | | |
|---|---|---|---|
| 2,722,524 | 11/1955 | Speck | 260—78 |
| 2,754,284 | 7/1956 | Speck | 260—78 |
| 3,094,511 | 6/1963 | Hill et al. | 260—78 |
HAROLD D. ANDERSON, Primary Examiner
U.S. Cl. X.R.
117—124 E, 128.4; 260—32.6 N